United States Patent [19]
Da Dalto et al.

[11] Patent Number: 5,600,964
[45] Date of Patent: Feb. 11, 1997

[54] APPARATUS FOR FREEZING OR DEEP-FREEZING FOOD PRODUCTS

[75] Inventors: Leone Da Dalto; Luca Ricci, both of Treviso, Italy

[73] Assignee: Alfagel S.p.A., Treviso, Italy

[21] Appl. No.: 401,147

[22] Filed: Mar. 8, 1995

[30] Foreign Application Priority Data

Mar. 9, 1994 [IT] Italy .................... PN94A0013

[51] Int. Cl.$^6$ .................................................. F25D 17/02
[52] U.S. Cl. ..................... 62/373; 34/164; 62/63
[58] Field of Search ..................... 62/57, 63, 60, 62/68, 373; 34/164

[56] References Cited

U.S. PATENT DOCUMENTS 3,738,121  6/1973  Swindell ........................... 62/57
4,611,469  9/1986  Musschoot ......................... 34/164

*Primary Examiner*—Ronald C. Capossela
*Attorney, Agent, or Firm*— Wenderoth, Lind & Ponack

[57] ABSTRACT

Apparatus for freezing or deep-freezing food products, in particular such products having at least a basic ingredient in the form of individual unitary pieces, and at least an additional ingredient, such as a condiment or the like. The apparatus includes a mixing and deep-freezing chamber formed by a flexible bag which is mounted on a support framework. The flexible bag is alternately moved in a vertical direction by a motor-driven mechanism which is connected to the framework.

10 Claims, 2 Drawing Sheets

APPARATUS FOR FREEZING OR DEEP-FREEZING FOOD PRODUCTS

BACKGROUND OF THE INVENTION

The present invention refers to an apparatus for freezing or deep-freezing food products, in particular products including at least a basic ingredient in the form of individual unitary pieces, and at least one additional ingredient, such as a condiment or the like, containing a relatively high percentage of water (in excess of 40%).

The Italian patent application no. PN93000043, filed on Jun. 18, 1993 by the same applicant as in the present application, discloses a food product of the above-identified type, as well as a method for the production thereof. The patent application particularly covers the production of pasta-based meals, with a sauce being added thereto for flavoring. The meals are then frozen or deep-frozen so as to provide a final product formed in individual unitary pieces, in which sauce granules are attached to the surface of the individual pieces of pasta. Both pasta and sauce are prepared and cooked separately with traditional methods and are then frozen either simultaneously or in successive steps. At the time of serving, i.e. after defrosting, both the pasta and the flavoring sauce appear to be intimately blended with each other and are immediately ready for consumption.

Apparatuses for freezing or deep-freezing food products have been known for a long time. The main drawbacks associated with such known freezing or deep-freezing apparatuses are due to the manner in which the ingredients are stirred or mixed. The stirring or mixing is done by mechanical means, such as a screw or a flight-type shaft rotating inside a rigid vessel. These mechanisms tend to treat the product in such a rough manner that the integrity of the product is frequently spoiled. Furthermore, ice incrustations inevitably form or build up on the vessel walls. Therefore, such mixing means must be provided with scraping means to remove the ice incrustations from the walls of the vessel.

The patent specification EP-A-0093506 discloses a method and an apparatus of the above-mentioned type. The described solution enables a pre-cooked food to be added to a dry and/or powdered substance so as to obtain a single mass of frozen or deep-frozen product which, after defrosting, is able to maintain the original proportions of the ingredients. Therefore, such a solution is not limited to the production of individual portions. On the other hand, the frozen product, given its solid and dense mass, requires a considerable amount of both time and heat in order to obtain a product which is ready to be served and eaten.

The patent specification EP-A-0188359 discloses another similar method and apparatus of the same kind as described in EP-A-0093506 and, therefore, includes basically the same drawbacks.

The patent specification LU 81065 discloses a method of freezing food products made up by vegetables, rice or pasta, in which additional ingredients, such as potato flakes or powdered herbs, are not allowed to contain more than 40% water. As a result, even this method has definite limitations concerning the products which can be obtained on the basis of the raw materials used.

The patent specification FR 2463585 describes a method for freezing liquid food products, in which liquids are frozen into blocks and are then broken into pieces of various shapes and forms, such as granules, spheres, crystals and the like.

Finally, U.S. Pat. No. 3,607,313 describes a method of quick-freezing food products on which a flavoring sauce is sprayed. Single pieces of product, such as green peas, which are entirely coated with sauce and frozen in a mixing drum, are obtained by the method.

As a result, from the current state of the art solutions, such as the afore discussed ones, are emerging which appear to have clear limitations with regard to the type of products that can be processed therewith and/or the complexity of the devices. Also, the prior art devices are not capable of handling the products with the care necessary to obtain frozen food products in single pieces, on the surface of which the additional ingredients, also frozen, may be able to adhere substantially in the form of granules.

SUMMARY OF THE INVENTION

It would therefore be desirable, and it is actually a main purpose of the present invention, to provide an apparatus for freezing or deep-freezing food products, which is substantially less complex in construction and is able to handle products much more gently, while in all cases ensuring more effective mixing of the same products.

Therefore, the present invention, so as it is defined in the appended claims, calls for the mixing and deep-freezing chamber to be formed by a flexible food support such as a bag or similar vessel, which is mounted on a support framework and is submitted to agitation and deformation by means of working means of a preferably electro-mechanical type. The working means operates in such a manner that the product to be frozen undergoes continuous mixing and is caused to progress from the feeding zone down to the unloading zone.

BRIEF DESCRIPTION OF THE DRAWINGS

Further purposes and features of the present invention will become apparent from the following description which is given by way of a non-limiting example with reference to the accompanying drawings, in which.

DETAILED DESCRIPTION OF THE INVENTION

Figure 1:
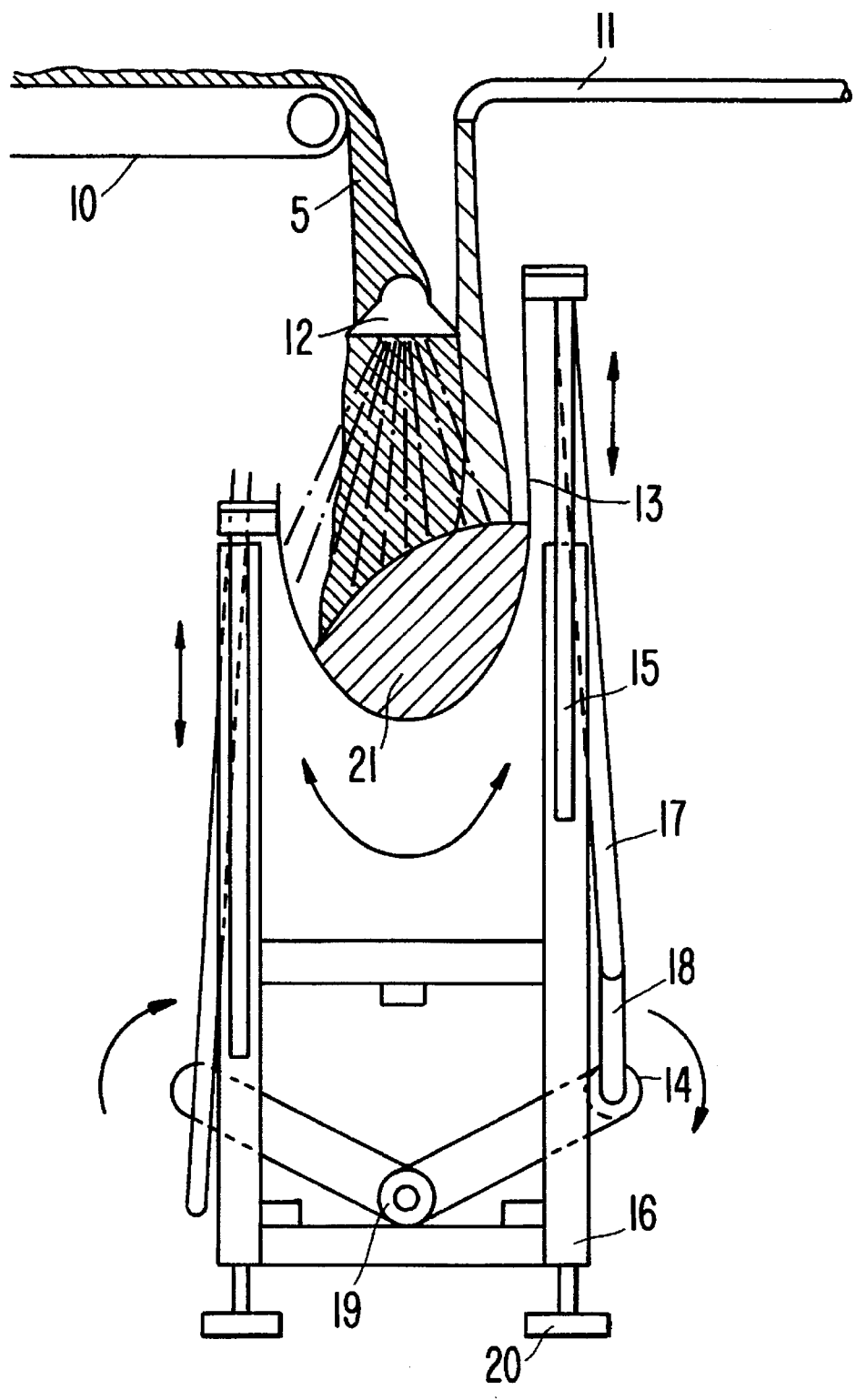
FIG. 1 is a schematic, cross-sectional view of an apparatus according to the present invention.

The apparatus according to the present invention includes feeding means for the basic product 5, such as for instance edible pasta cooked in a traditional manner. The feeding means is usually formed by a motor-driven conveyor belt 10. The apparatus also includes feeding means for at least an additional ingredient 6, such as for instance flavoring sauce prepared in any traditional way. The additional feeding means is usually formed by a simple pipe 11 connected to a vessel (not shown) containing the ingredient. Also, feeding means for a cryogenic medium, such as for instance carbon dioxide, may be provided. The cryogenic medium feeding means is formed by one or more bell-like containers 12 with medium ejecting nozzles.

The main feature of the present invention is that the food support or vessel 13 acts as the mixing and the deep-freezing chamber. The vessel 13 is formed by a bag of a flexible material suitable for holding food products (such as for instance polypropylene). The vessel 13 is mounted on a support framework 14 so as to be suspended therein and to be moved alternately in a vertical direction by means of a motor-driven mechanism that will be described below.

The vessel 13 has upper edges attached to the end portions of a plurality of opposing pairs of vertical bars 15 which are slidably inserted in respective hollow upright elements 16 of the support framework 14. Each bar 15 is pivotally connected to the upper end portion of a connecting rod 17. All of the connecting rods 17 are connected, through respective crank mechanisms 18, to a common driving shaft 19 which is rotated by a motor (not shown).

Figure 2:
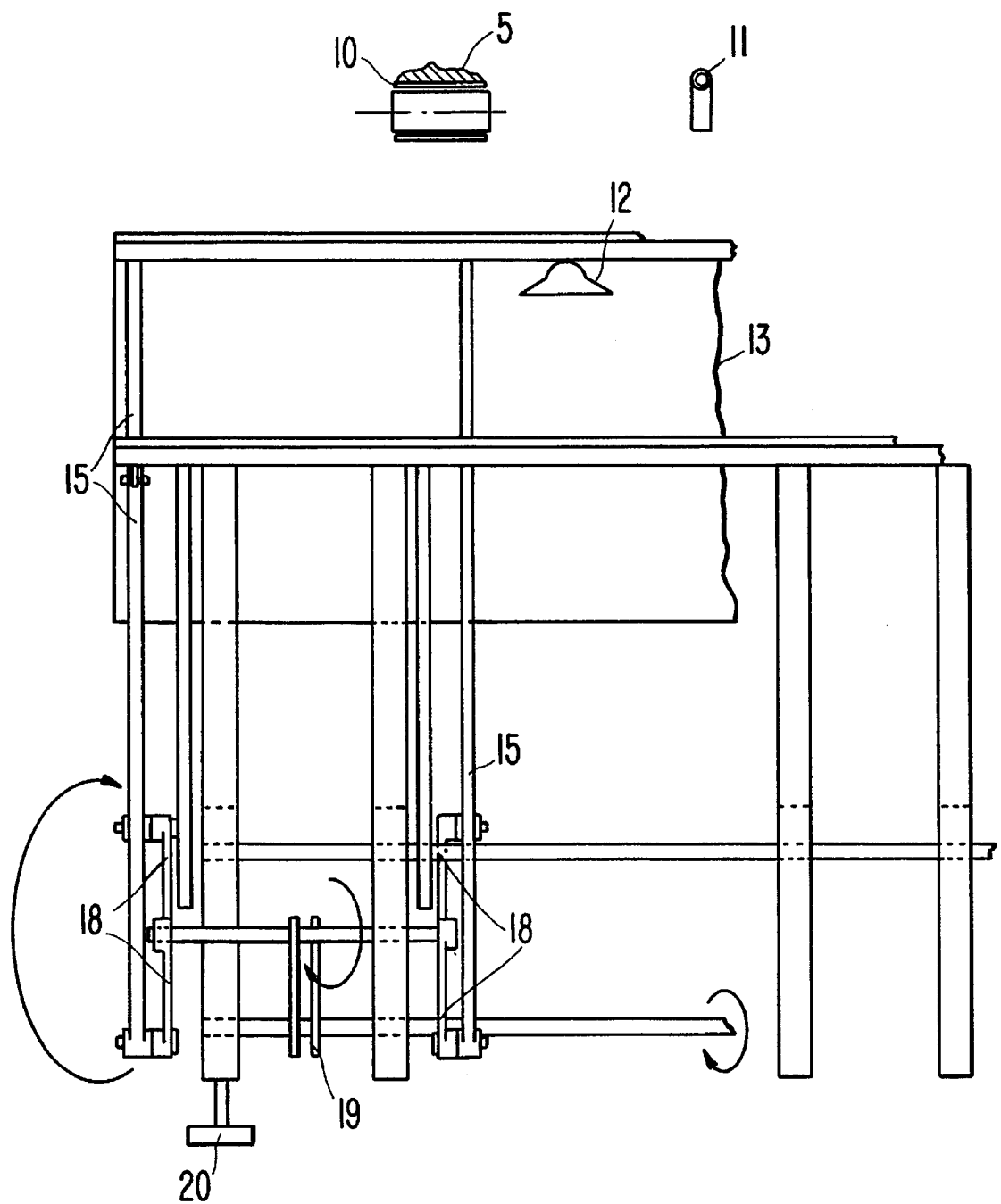
FIG. 2 is a schematic, partial side view of the apparatus shown in FIG. 1.

The support framework 14 is mounted on feet 20 which are preferably of the hydraulic-jack type in view of the possibility of adjusting the inclination of the support framework by changing the height of the hollow upright elements 16. The inclination of the support framework 14 promotes the displacement of the product 21 along the bag-like vessel 13 from the feeding zone, which is arranged at one of the ends of the apparatus (for instance, on the left side in FIG. 2), downwardly towards the unloading zone at the opposite end of the apparatus.

The whole apparatus is of course enclosed in a housing (not shown) so as to ensure the required tightness and process hygienics. Furthermore, the apparatus shall also be provided with actuation and control means that are not described herein, since it is assumed that they are largely known to anyone skilled in the art.

The operation of the apparatus is simple and readily understood. The cooked product 5, such as pasta, is fed by the conveyor belt 10 to the feeding end portion or zone of the apparatus. The cooked product 5 falls into the bag-like vessel 13 at which point it comes into contact with both the cryogenic medium, flowing in from the bells 12, and the flavoring sauce which is delivered through pipe 11. The bag-like vessel 13 is constantly kept moving by the motor-driven mechanism 15–19 and, as a consequence, the shape of vessel 13 continuously changes shape. The product to be frozen is continuously mixed, thereby preventing ice incrustations from forming or building up on the walls of the bag-like vessel 13.

The continuous movement of the bag-like vessel 13 causes the product to be displaced upwards as long as the inner cohesive force of the product is higher than the force of gravity that acts on the product. When the force of gravity exceeds the inner cohesive force of the product, the latter starts sliding down on itself and along the walls of the bag-like vessel, thereby causing the pasta, the sauce and the carbon dioxide to be thoroughly mixed together.

The inclination of the support framework 14, which is set by adjusting the feet 20, makes it possible for the product to progress from the feeding zone towards the unloading zone while it is being mixed in the bag-like vessel in the above-described manner.

Therefore, the characteristics and the advantages of the present invention can be summarized as follows: simple construction, gentle handling of the product while obtaining thorough mixing thereof, and elimination of ice build-up in the deep-freezing chamber.

It will of course be appreciated that the above-described apparatus may be the subject of any addition or modification considered to be appropriate, without departing from the scope of the present invention. For instance, the number, the type and the arrangement of the feeding means for the basic ingredient, the additional ingredient and/or the cryogenic medium may differ from the above-described ones. Even the means for imparting movement of the bag-like vessel 13 may be different, as long as the above-described operating principle remains unaltered.

Furthermore, the bag-like vessel 13 may be replaced by a sealed tubular conduit which may be supported by or suspended in the framework 14 so as to be continuously agitated and deformed by working means similar to those referenced with the numerals 15–19 in the previously described embodiment. Such an alternative solution may make it possible to do away with the casing or housing used to enclose the whole apparatus. It will of course be appreciated that the tubular conduit shall be provided with appropriate openings to which feeding conduits, for both of the products to be frozen or deep-frozen and the media required to perform such a process, must be connected in a water and air tight manner.

We claim:

1. An apparatus for freezing food products, said apparatus comprising:

a support framework including first and second pairs of longitudinally extensible vertical support members, wherein said first pair of support members is of a greater height than said second pair of support members;

a flexible food support member connected to said first and second pairs of vertical support members so as to be suspended within said support framework;

a food product feeding device positioned near said first pair of vertical support members;

a food product freezing device located adjacent said flexible food support member; and a mechanical drive mechanism connected to each of said vertical support members, wherein said support members are extended and contracted to move said flexible food support member.

2. The apparatus as claimed in claim 1, wherein said flexible food support member defines a freezing chamber and has opposite side edges which are attached at the top of said vertical support members, and said side edges are alternately raised and lowered by said mechanical drive mechanism to continuously agitate food products supported thereon and to facilitate movement of food products from one end of said flexible food support member to an opposite end of said flexible food support member.

3. The apparatus as claimed in claim 1, further comprising means, located adjacent said food product feeding device, for delivering an ingredient to be mixed with a food product in said food support member.

4. The apparatus as claimed in claim 3, wherein said flexible food support member is formed of polypropylene.

5. The apparatus as claimed in claim 4, wherein said mechanical drive mechanism comprises:

a common rotary shaft; and a plurality of crank and connecting rod mechanisms operably coupled between said common rotary shaft and said vertical support members, respectively.

6. The apparatus as claimed in claim 4, wherein each of said crank and rod mechanisms comprises:

a first rod having a first end operably connected to said rotary shaft and a second end; and a second rod having a first end pivotally connected to said second end of said first rod, and a second end pivotally connected to said vertical bar.

7. The apparatus as claimed in claim 1, wherein said flexible food support member is made of a plastic material.

8. The apparatus as claimed in claim 1, further comprising a hydraulic jack provided on a lower end of each of said vertical support members for adjusting the height of said vertical support member and thereby changing the inclination of said support framework.

9. The apparatus as claimed in claim 1, wherein each of said vertical support members comprises:

a hollow upright element having an open upper end; and a vertical bar having an upper end and a lower end slidably received in said open upper end of said hollow upright element.

10. The apparatus as claimed in claim 1, wherein said flexible food support member comprises a sealed tubular conduit having at least one opening for receiving a food product and at least one opening for receiving a cryogenic medium.

* * * * *